United States Patent
Chikuma et al.

(10) Patent No.: US 7,460,264 B2
(45) Date of Patent: Dec. 2, 2008

(54) RECORDING APPARATUS, RECORDING SYSTEM, AND METHOD OF CONTROLLING RECORDING APPARATUS

(75) Inventors: Toshiyuki Chikuma, Kawasaki (JP); Jiro Moriyama, Kawasaki (JP); Hidehiko Kanda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 11/044,985

(22) Filed: Jan. 27, 2005

(65) Prior Publication Data

US 2005/0213134 A1    Sep. 29, 2005

(30) Foreign Application Priority Data

Jan. 29, 2004  (JP)  ............... 2004-021314
Feb. 26, 2004  (JP)  ............... 2004-052123

(51) Int. Cl.
*G06F 3/12*    (2006.01)
*G06F 13/00*   (2006.01)
*H04N 1/40*    (2006.01)
*H04N 1/48*    (2006.01)

(52) U.S. Cl. ............. 358/1.15; 358/1.13; 358/426.07
(58) Field of Classification Search ............. 358/1.15, 358/426.01, 426.02, 426.007, 426.08; 347/9, 347/15; 382/162, 167
See application file for complete search history.

(56) References Cited

U.S. PATENT DOCUMENTS 5,276,478 A * 1/1994 Morton ................. 355/22
5,533,171 A * 7/1996 Miura .................. 358/1.12
6,025,929 A   2/2000 Nakajima
6,053,596 A * 4/2000 Nakano et al. ........... 347/15
6,963,420 B1* 11/2005 Kawamoto et al. ....... 358/1.16
2002/0015010 A1* 2/2002 Takahashi ............... 345/60
2003/0107753 A1  6/2003 Sakamoto
2003/0160999 A1* 8/2003 Namizuka ............... 358/1.15
2003/0184813 A1* 10/2003 Kobayashi et al. ..... 358/426.01
2003/0215158 A1* 11/2003 Yamada ................ 382/300
2004/0246527 A1* 12/2004 Kakutani ............... 358/3.01

FOREIGN PATENT DOCUMENTS

| JP | 7152509      | 6/1995  |
| JP | 2000-280582 A | 10/2000 |
| JP | 2001-075765 A | 3/2001  |
| JP | 2003-114778 A | 4/2003  |

* cited by examiner

*Primary Examiner*—Kimberly A Williams
(74) *Attorney, Agent, or Firm*—Canon U.S.A. Inc., I.P. Division

(57) ABSTRACT

A recording apparatus having a plurality of interfaces capable of communicating with external devices performs recording based on recording data input through any one of the plurality of interfaces. The recording apparatus determines which interface is used for receiving the recording data from the plurality of interfaces, and performs conversion processing on the recording data by increasing the amount of data in accordance with the determination result of which interface is used for receiving the recording data. The conversion processing changes depending on whether or not the interface used for receiving the recording data is an interface having a relatively high transfer rate (high speed interface).

9 Claims, 13 Drawing Sheets

FIG. 3

| INTERFACE | USB | 1284 | 1394 | IrDA | S/C | BT | OTHER |
|---|---|---|---|---|---|---|---|
| THE POSSIBILITY OF DETERMINATION | ○ | ○ | ○ | ○ | × | ○ | × |
| HIGH SPEED/ LOW SPEED | HIGH SPEED | HIGH SPEED | HIGH SPEED | LOW SPEED | LOW SPEED | LOW SPEED | LOW SPEED |

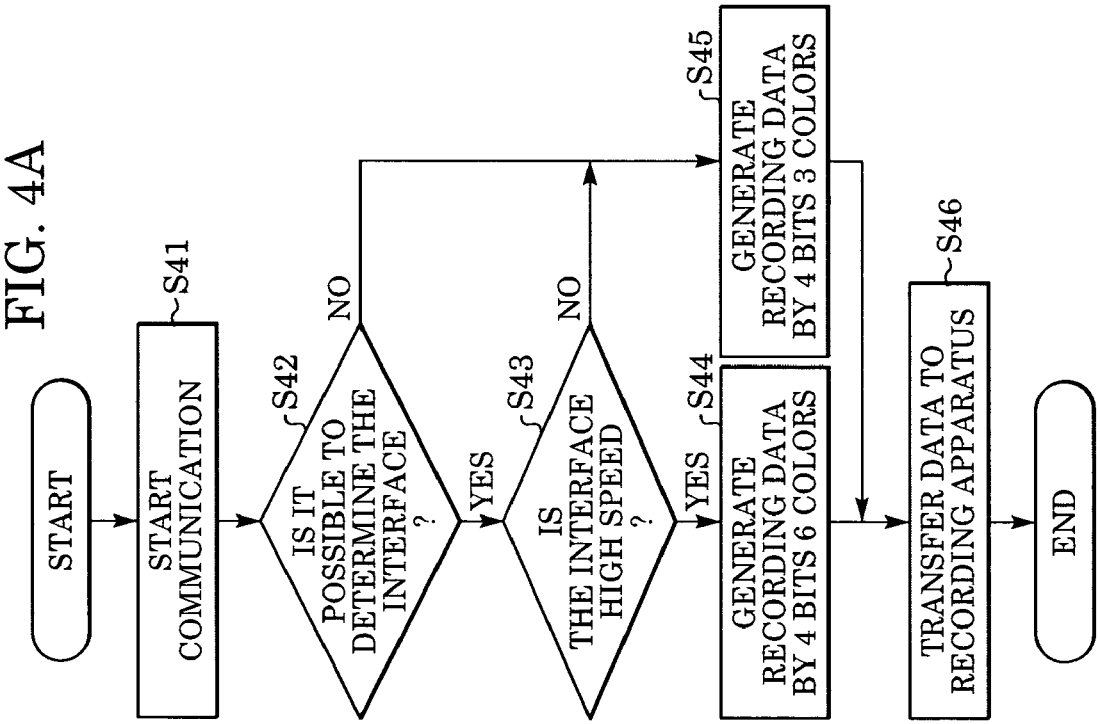
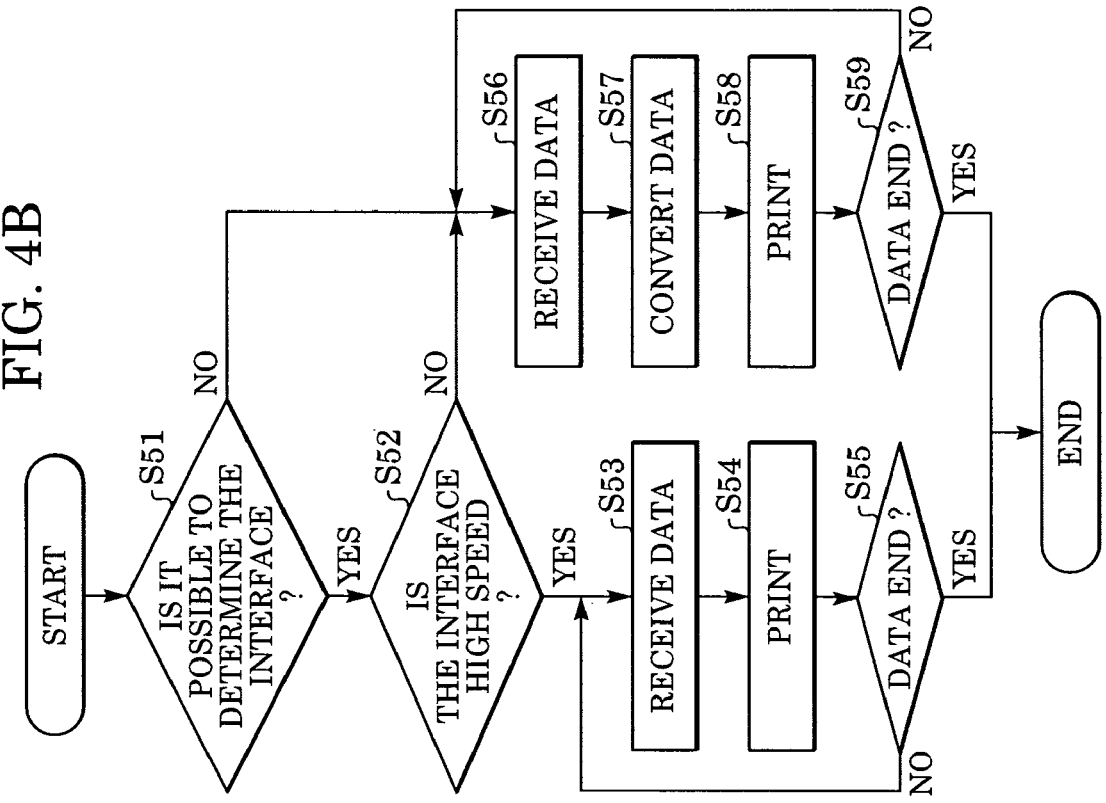

FIG. 5

| OUTPUT VALUE | NUMBER OF DOTS |
|---|---|
| 00 | 0 |
| 01 | 1 |
| 10 | 2 |
| 11 | 3 |

FIG. 6

| OUTPUT VALUE | SMALL DATA | LARGE DATA |
|---|---|---|
| 0000 | 00 | 00 |
| 0001 | 01 | 00 |
| 0010 | 10 | 00 |
| 0011 | 01 | 01 |
| 0100 | 10 | 01 |
| 0101 | 01 | 10 |
| 0110 | 10 | 10 |
| 0111 | 01 | 11 |
| 1000 | 10 | 11 |

FIG. 7

| OUTPUT VALUE | SMALL DOT ||  LARGE DOT ||
|---|---|---|---|---|
| | SMALL DATA | NUMBER OF DOTS | LARGE DATA | NUMBER OF DOTS |
| 0000 | 00 | 0 | 00 | 0 |
| 0001 | 01 | 1 | 00 | 0 |
| 0010 | 10 | 2 | 00 | 0 |
| 0011 | 01 | 1 | 01 | 1 |
| 0100 | 10 | 2 | 01 | 1 |
| 0101 | 01 | 1 | 10 | 2 |
| 0110 | 10 | 2 | 10 | 2 |
| 0111 | 01 | 1 | 11 | 3 |
| 1000 | 10 | 2 | 11 | 3 |

FIG. 8

| BEFORE CONVERSION | AFTER CONVERSION |
|---|---|
| 00 | 0000 |
| 01 | 1000, 0100 OR 0010 |
| 10 | 1100, 1010 OR 0110 |
| 11 | 1110 |

FIG. 9

| BEFORE CONVERSION | AFTER CONVERSION |
|---|---|
| 00 | 0000 |
| 01 | 1000 → 0100 → 0010 → |
| 10 | 1100 → 1010 → 0110 → |
| 11 | 1110 |

FIG. 11

| OUTPUT VALUE | NUMBER OF DOTS | AFTER CONVERSION |
|---|---|---|
| 0000 | 0 | [00000000] |
| 0001 | 1 | [10000000] [01000000] [00100000] [00010000] [00001000] [00000100] [00000010] [00000001] |
| 0010 | 2 | [11000000] [10100000] [10010000] [10001000] [10000100] [10000010] [10000001] [01100000] [01010000] [01001000] [01000100] [01000010] [01000001] [00110000] [00101000] [00100100] [00100010] [00100001] [00011000] [00010100] [00010010] [00010001] [00001100] [00001010] [00001001] [00000110] [00000101] [00000011] |
| 0011 | 3 | [11100000] [11010000] [11001000] [11000100] [11000010] [11000001] [10110000] [10101000] [10100100] [10100010] [10100001] [10011000] [10010100] [10010010] [10010001] [10001100] [10001010] [10001001] [10000110] [10000101] [10000011] [01110000] [01101000] [01100100] [01100010] [01100001] [01011000] [01010100] [01010010] [01010001] [01001100] [01001010] [01001001] [01000110] [01000101] [01000011] [00111000] [00110100] [00110010] [00110001] [00101100] [00101010] [00101001] [00100110] [00100101] [00100011] [00011100] [00011010] [00011001] [00010110] [00010101] [00010011] [00001110] [00001101] [00001011] [00000111] ...... 70 PATTERNS IN TOTAL |
| 0100 | 4 | [11110000] [11101000] [11100100] [11100010] [11100001] [11011000] [11010100] [11010010] [11010001] [11001100] [11001010] [11001001] [11000110] [11000101] [11000011] [10111000] [10110100] [10110010] [10110001] [10101100] [10101010] [10101001] [10100110] [10100101] [10100011] [10011100] [10011010] [10011001] [10010110] [10010101] [10010011] [10001110] [10001101] [10001011] [10000111] ...... 56 PATTERNS IN TOTAL |
| 0101 | 5 | 11111000<br>11110100<br>11110010<br>11110001 ...... 56 PATTERNS IN TOTAL |
| 0110 | 6 | 11111100<br>11111010<br>11111001 ...... 28 PATTERNS IN TOTAL |
| 0111 | 7 | [11111110] [11111101] [11111011] [11110111] [11101111] [11011111] [10111111] [01111111] |
| 1000 | 8 | 11111111 |

FIG. 13

| INTERFACE | | DETERMINATION POSSIBLE | | | DETERMINATION IMPOSSIBLE (UNKNOWN) | |
|---|---|---|---|---|---|---|
| | | HIGH SPEED | LOW SPEED | LOW SPEED | LOW SPEED | |
| HOST APPARATUS | QUANTIZATION PROCESSING | ED | DITHER | DITHER | | |
| | COMPRESSION PROCESSING | COMPRESSION B | COMPRESSION A | COMPRESSION A | | |
| | NUMBER-OF-COLORS CONVERSION PROCESSING | 6 | 3 | 3 | | |
| | NUMBER-OF-BITS CONVERSION PROCESSING | EACH 2 → EACH 4 | EACH 4 | EACH 4 | | |
| AT DATA-TRANSMISSION TIME | NUMBER OF COLORS | 6 | 3 | 3 | | |
| | NUMBER OF BITS | EACH 4 | EACH 4 | EACH 4 | | |
| RECORDING APPARATUS | NUMBER-OF-COLORS CONVERSION PROCESSING | 6 | 3 → 6 | 3 → 6 | | |
| | NUMBER-OF-BITS CONVERSION PROCESSING | EACH 4 | EACH 4 | EACH 4 | | |

FIG. 14

| | INTERFACE | DETERMINATION POSSIBLE | | DETERMINATION IMPOSSIBLE (UNKNOWN) |
|---|---|---|---|---|
| | | HIGH SPEED | LOW SPEED | LOW SPEED |
| HOST APPARATUS | QUANTIZATION PROCESSING | ED | DITHER | DITHER |
| | COMPRESSION PROCESSING | COMPRESSION B | COMPRESSION A | COMPRESSION A |
| | NUMBER-OF-COLORS CONVERSION PROCESSING | 3→6 | 3 | 3 |
| | NUMBER-OF-BITS CONVERSION PROCESSING | EACH 4 | EACH 4 | EACH 4 |
| AT DATA-TRANSMISSION TIME | NUMBER OF COLORS | 6 | 3 | 3 |
| | NUMBER OF BITS | EACH 4 | EACH 4 | EACH 4 |
| RECORDING APPARATUS | NUMBER-OF-COLORS CONVERSION PROCESSING | 6 | 3→6 | 3→6 |
| | NUMBER-OF-BITS CONVERSION PROCESSING | EACH 4 | EACH 4→EACH 4 | EACH 4→EACH 4 |

FIG. 15

| INTERFACE | USB | 1284 | 1394 | IrDA | S/C | BT | OTHER |
|---|---|---|---|---|---|---|---|
| THE POSSIBILITY OF DETERMINATION | ○ | ○ | ○ | ○ | × | ○ | × |
| HIGH SPEED/ LOW SPEED | HIGH SPEED | HIGH SPEED | HIGH SPEED | LOW SPEED | HIGH SPEED | LOW SPEED | HIGH SPEED |

RECORDING APPARATUS, RECORDING SYSTEM, AND METHOD OF CONTROLLING RECORDING APPARATUS

CROSS REFERENCE TO RELATED APPLICATIONS

This application is related to co-pending applications Ser. Nos. 11/044,845 and 11/044,447 filed on Jan. 27, 2005.

BACKGROUND OF THE INVENTION

1. Field of the Invention

The present invention relates to a recording apparatus, a recording system, and a method of controlling a recording apparatus. More particularly, the present invention relates to a recording apparatus, a recording system, and a method of controlling a recording apparatus that has a plurality of types of interfaces.

The present invention can be applied to all of the apparatuses that perform recording using paper, cloth, leather, nonwoven cloth, OHP (overhead projector) sheets, etc., further on metal, etc., as a recording medium. Specifically, the apparatuses to which the present invention can be applied include business equipment, such as a printer, a copying machine, a facsimile, etc., and industrial production machinery and the like.

2. Description of the Related Art

In recent years, personal computers, word processors, facsimile machines, etc., have become widespread in offices and homes, and thus printers of various recording methods have been developed as information output devices for these pieces of equipment. Among these various printers, printers using an ink-jet method have advantages in that the printers can easily allow color recording, have a low noise at operation time, enable high-quality recording on various recording media, have a small size, and so on. Thus, the printers are best suited for personal use in offices and homes. Among ink-jet printers, ink-jet recording apparatuses (in the following, referred to as "recording apparatuses" or "printers") of serial scanning type, which record data while a recording head is reciprocally scanning on a recording medium, are widespread in the market, because the apparatuses allow the printing of high-quality images at a low cost.

Also, the types of the interfaces between recording apparatuses and host computers have increased together with the widespread use of recording apparatuses. For interfaces, there are wired, wireless, and furthermore, serial communication, parallel communication, infrared data communication and the like. Thus, there are apparatuses having a plurality of interfaces of different types. For example, in Japanese Laid-Open Patent Application Publication No. 2001-75765, a structure of an ink-jet printer having an infrared-data communication interface and capable of receiving data by wireless communication has been disclosed.

However, the amount of data to be printed is on the rise, because data becomes high resolution, high quality, multicolored, etc. Also, since a printer engine itself works at a higher speed, the amount of data to be transferred is also on the rise. In these circumstances, in order to deal with a plurality of interfaces, there arises a problem in the differences of individual transfer rates.

For example, the data size that can be transferred without a problem using a high speed interface, such as an interface conforming to the USB (universal serial bus) standards version 2.0, is sometimes too large for the transfer rate of a low speed interface (for example, the BT (Bluetooth) standards) to handle the processing speed of a printer engine. In this manner, if the data transfer cannot handle the processing, data waiting occurs in the printer, and results in longer print time. That is to say, in a serial printer, a start of a scan is related to the reception of data to be recorded at the next scan, and thus if the data transfer cannot handle the processing, a state of waiting for the reception of the data to be used for the recording occurs. If such a state of the data waiting occurs, preliminary ink ejection increases in order for the nozzles to be maintained in a good state for printing, which increases the waste ink at the same time. Also, it is known that color irregularities occur by the influence of time difference from the ink-penetration mechanism on the recording medium. If the time intervals between scans change at random by the data waiting described above, color irregularities might occur.

On the other hand, it becomes possible to prevent the occurrence of a waiting state at the time of using an interface having a low speed transfer rate by simply reducing the number of grayscales in order to decrease the amount of data. However, this results in significant degradation of image quality when a low speed interface is employed. Also, if a design is carried out by reducing the number of grayscales so as to adjust to a low speed interface, a problem might occur in that high-quality images cannot be recorded using a high speed interface.

SUMMARY OF THE INVENTION

The present invention has been made in view of the above-described problems. The present invention performs appropriate recording in accordance with an interface when recording is performed by an apparatus having a plurality of interfaces with different transfer rates.

According to an aspect of the present invention, there is disclosed a recording apparatus having a plurality of interfaces capable of communicating with external devices, for recording using a recording head based on recording data input through any one of the plurality of interfaces. The recording apparatus includes: interface determination means for determining which interface from the plurality of interfaces is used for receiving the recording data; and control means for changing processing on the received recording data in accordance with a determination result from the interface determination means.

According to another aspect of the present invention, there is provided a method of controlling an external device, externally connected to a recording apparatus for recording based on recording data, for transferring recording data through any one of a plurality of interfaces possessed by the recording apparatus, the method including: a determination step for determining which interface is used for transferring recording data to the recording apparatus among the plurality of interfaces included in the recording apparatus; a generation step for generating recording data corresponding to an image to be recorded by the recording apparatus to be connected; and a transfer step for transferring the recording data generated in the generation step to the recording data, wherein generation processing in the generation step changes in accordance with the interface determined by the determination step.

According to yet another aspect of the present invention, there is disclosed a recording apparatus having a plurality of interfaces capable of communicating with external devices, for recording using a recording head based on recording data input through any one of the plurality of interfaces, the recording apparatus including: interface determination means for determining which interface from the plurality of interfaces is used for receiving the recording data; control means for recording in accordance with a method of recording selected from a plurality of different recording methods having different recording speeds on a recording medium with each other; and selection means for selecting a recording method used for recording based on the interface determined by the interface determination means, wherein when the interface determined by the determination means is an interface having a relatively high transfer rate among the plurality of interfaces, the conversion means performs conversion processing on the recording data with increasing the amount of data among a plurality of recording method having a relatively high recording speed than a recording method selected when the interface has a relatively low transfer rate.

According to still another aspect of the present invention, there is provided a recording system including a recording apparatus having a plurality of interfaces capable of communicating with external devices, for recording using a recording head based on recording data input through any one of the plurality of interfaces, and an external device capable of being connected to the recording apparatus through the interface, the system including: the external device including: determination means for determining an interface to be connected in order to transfer recording data to the recording apparatus among a plurality of interfaces possessed by the recording apparatus; generation means for generating recording data corresponding to an image to be recorded in the recording apparatus to be connected; and transfer means for transferring the recording data generated by the generation means to the recording apparatus through the interface, wherein generation processing by the generation means changes based on the interface determined by the determination means, the recording apparatus comprising control means for changing processing on the input recording data in accordance with the interface having received the recording data from the external device.

Further aspects, features and advantages of the present invention will become apparent from the following description of exemplary embodiments with reference to the attached drawings.

BRIEF DESCRIPTION OF THE DRAWINGS

FIG. 3 is a pattern diagram illustrating an example of an interface determination according to a first embodiment of the present invention.

FIG. 4 is a flowchart illustrating the processing according to the first embodiment of the present invention.

FIG. 5 is a pattern diagram illustrating a relationship between output values and the number of dots used for recording according to the first embodiment of the present invention.

FIG. 6 is a pattern diagram illustrating a relationship between output values and the types of dots used for recording according to the first embodiment of the present invention.

FIG. 7 is a pattern diagram illustrating a relationship among output values, the types of dots and the number of dots used for recording according to the first embodiment of the present invention.

FIG. 8 is a pattern diagram illustrating data conversion according to the first embodiment of the present invention.

FIG. 9 is a pattern diagram illustrating data conversion according to the first embodiment of the present invention.

FIG. 11 is a pattern diagram illustrating data conversion according to the second embodiment of the present invention.

FIG. 13 is a diagram illustrating an example of a record data status in each processing step according to the first embodiment of the present invention.

FIG. 14 is a diagram illustrating an example of a record data status in each processing step according to the first embodiment of the present invention.

FIG. 15 is a pattern diagram illustrating an example of an interface determination according to the first embodiment of the present invention.

DESCRIPTION OF THE EMBODIMENTS

In the following, detailed descriptions will be given of exemplary embodiments for achieving the present invention with reference to the attached drawings. Note that the dimensions, the shapes, and the relative configurations of the components illustrated as an example in the present embodiments should appropriately changed depending on the configuration to which the present invention is applied and various conditions, and the present invention is not limited to those examples.

In the embodiments described below, descriptions will be given of a recording apparatus using a recording head in accordance with an ink-jet method with reference to the examples.

In this regard, in this specification, "recording" (sometimes referred to as "print") represents a case where images, designs, patterns, etc., are widely formed on a recording medium or a case where a medium is processed, not only when meaningful information, such as characters, figures, etc., are formed, but also when regardless of whether the information is meaningful or meaningless, and regardless of whether or not the information is visually perceived by human beings.

Also, "recording medium" represents not only paper used by a recording apparatus in general, but also something that can receive ink, widely, for example, cloth, a plastic film, a metal plate, glass, ceramic, wood, leather, etc.

Furthermore, "ink" (sometimes, referred to as "liquid") should be widely interpreted in the same manner as the definition of "recording (print)" described above. The "ink" represents liquid which can serve to form an image, a design, a pattern, etc. on a recording medium, to process a recording medium, or to conduct ink processing (for example, solidification or insolubilization of coloring material in ink to be attached to a recording medium).

Also, the term "nozzle" generally refers to an ejection outlet, a liquid path communicating with the outlet, and an element generating energy to be used for ejecting ink if not mentioned specifically.

Figure 1:
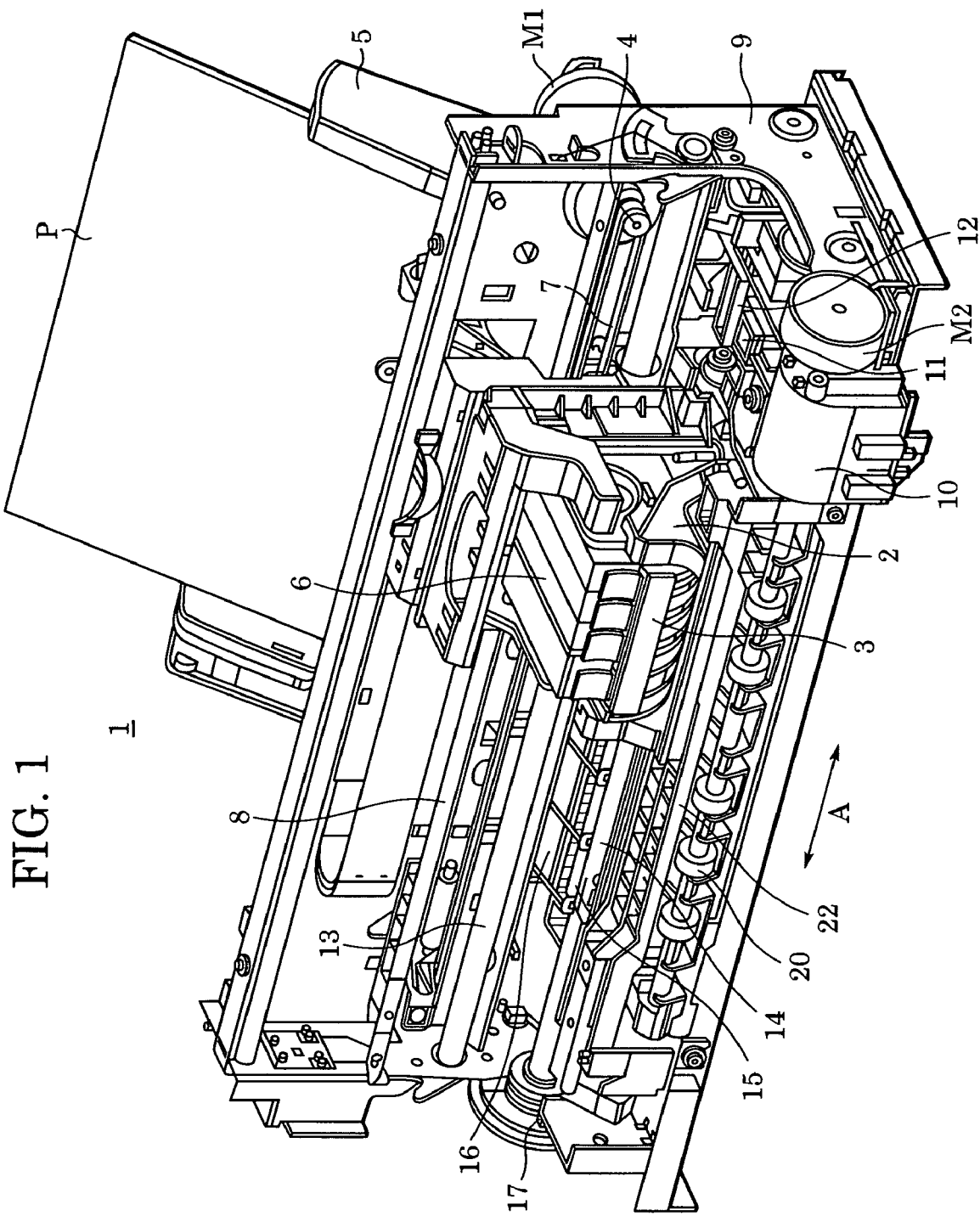
FIG. 1 is an outer perspective view of a schematic structure of an ink-jet recording apparatus according to an embodiment of the present invention.

Description of Ink-Jet Recording Apparatus (FIG. 1)

FIG. 1 is a perspective view illustrating a recording apparatus 1 to which the present invention can be applied. FIG. 1 shows a structure of an ink-jet recording apparatus as a typical embodiment.

In the ink-jet recording apparatus shown in FIG. 1, a driving force generated by a carriage motor M1 is transferred, through a transmission mechanism 4, to a carriage 2 mounting a recording head 3 for performing recording by ejecting ink in accordance with an ink-jet method. Thus, the carriage 2 is moved reciprocally in the directions of arrow A. At the same time, for example, a recording medium P, such as recording paper, is fed through a paper feeding mechanism 5, and is conveyed to a recording position. At that position, recording is performed by ejecting ink onto the recording medium P from the recording head 3.

The carriage 2 is moved to the position of a recovery device 10 for intermittently performing ejection recovery processing of the recording head 3 in order to maintain the recording head 3 in a good state.

In addition to the recording head 3 being mounted on the carriage 2 of the recording apparatus 1, ink cartridges 6 reserving ink to be supplied to the recording head 3 are also attached to the carriage 2. The ink cartridges 6 are attachable to and detachable from the carriage 2.

Four ink cartridges, each of which contains magenta (M), cyan (C), yellow (Y), and black (K) ink, respectively, are mounted on the carriage 2 of the recording apparatus 1 shown in FIG. 1. Color recording is possible by ejecting the plurality of different color inks on the recording medium. The four ink cartridges are individually arranged in an attachable and detachable manner independently, so that any of the cartridges can be replaced by the user, who is the operator, when ink is consumed.

Here, the carriage 2 and the recording head 3 are constructed such that the contact surfaces of both members properly contact with each other in order to maintain predetermined electrical contact. The recording head 3 selectively ejects ink from a plurality of ejection outlets for recording by applying energy in accordance with a recording signal. For example, the recording head 3 in this embodiment employs an ink-jet method for ejecting ink using heat energy. The recording head 3 includes electro-thermal transformers for generating heat energy. Electric energy applied to the electro-thermal transformers is transformed into heat energy. The heat energy is supplied to ink to be ejected from the ejection outlet by using pressure changes caused by growth and contraction of bubbles by film boiling. Each of the electro-thermal transformers is provided corresponding to each ejection outlet. Ink is ejected from a corresponding ejection outlet by a pulse voltage which is applied to a corresponding electro-thermal transformer in accordance with the recording signal.

As shown in FIG. 1, the carriage 2 is connected to part of a driving belt 7 of the transmission mechanism 4 transmitting the driving force of the carriage motor M1, and is supported and guided slidably along a guide shaft 13 in the directions of arrow A. Accordingly, the carriage 2 reciprocally moves along the guide shaft 13 by the normal rotation and the reverse rotation of the carriage motor M1. Also, a scale 8 is provided for indicating an absolute position of the carriage 2 along the movement direction (the directions of arrow A) of the carriage 2.

Also, the recording apparatus 1 is provided with a platen (not shown) facing the ejection outlet surface on which an ejection outlet (not shown) of the recording head 3 is formed. Recording is performed over the total width of the recording paper P conveyed on the platen by the recording head 3 to which a recording signal is given to eject ink while the carriage 2 is moving reciprocally.

Furthermore, the recording apparatus 1 shown in FIG. 1 includes a conveyor roller 14 driven by the conveyor motor M2 for conveying the recording medium P. A pinch roller 15 contacts the recording medium P on the conveyor roller 14 by a spring (not shown). A pinch roller holder 16 rotatably supports the pinch roller 15. A conveyor roller gear 17 is fixed at one end of the conveyor roller 14. The conveyor roller 14 is driven by the rotation of the conveyor motor M2 transmitted to the conveyor roller gear 17 through an intermediate gear (not shown).

An ejection roller 20 ejects the recording medium P on which an image is formed by the recording head 3 outside of the recording apparatus. The ejection roller is driven by the transmission of the rotation of the conveyor motor M2. A spur holder 22 rotatably supports a spur roller.

Control Configuration (FIG. 2) of Ink-Jet Recording Apparatus

Figure 2:
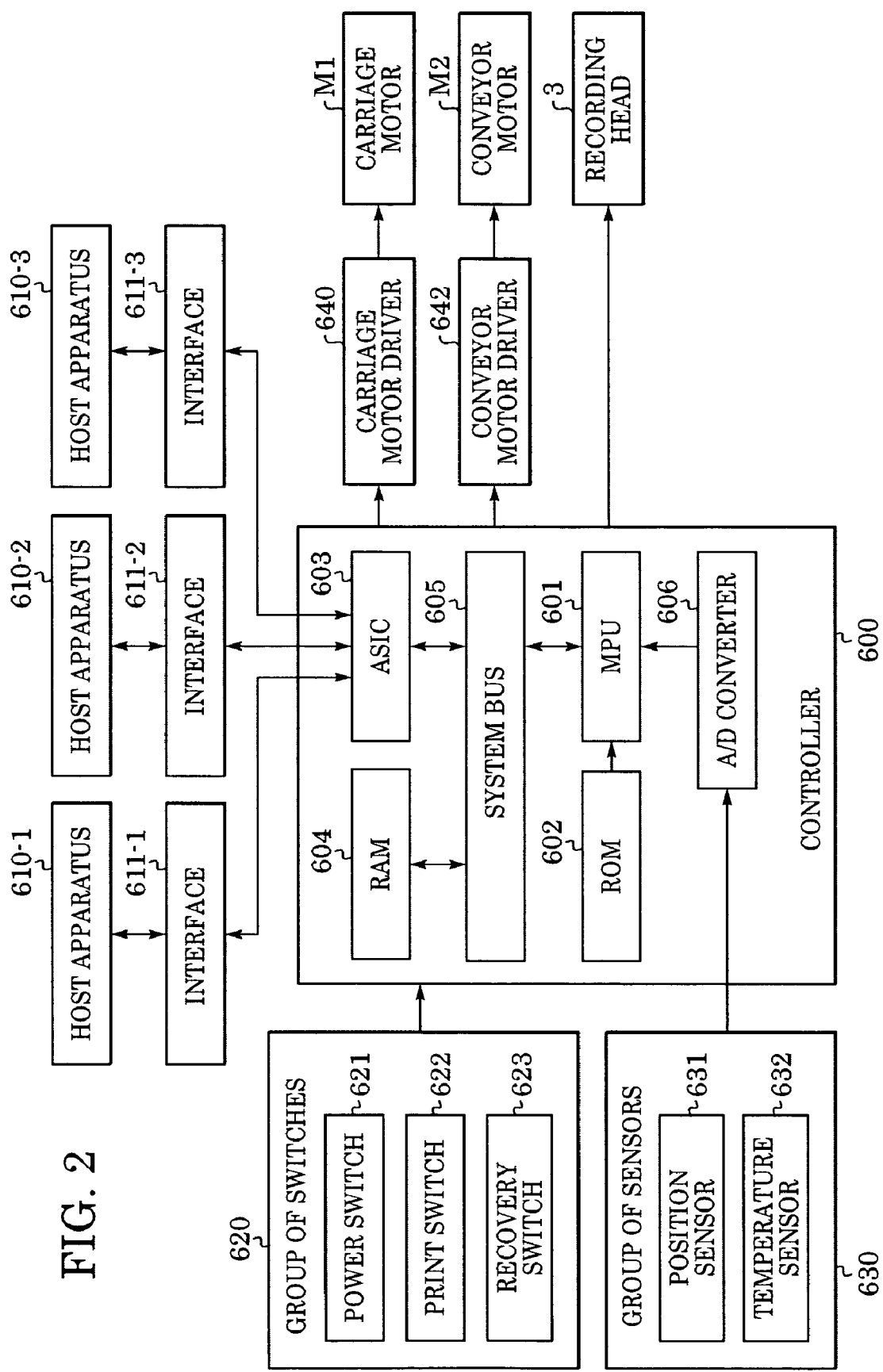
FIG. 2 is a block diagram illustrating a configuration of a control circuit of the ink-jet recording apparatus shown in FIG. 1.

FIG. 2 is a block diagram illustrating a control configuration of the ink-jet recording apparatus 1 shown in FIG. 1.

As shown in FIG. 2, the recording apparatus 1 to which the present invention can be applied includes a plurality of interfaces 611-1, 611-2 and 611-3 so as to allow communication with external devices. Also, a controller 600 shown in FIG. 2 includes: a ROM (read-only memory) 602 storing a program corresponding to a control sequence described below, necessary tables, and other fixed data; an MPU (micro-processing unit) 601 for controlling the recording apparatus 1 including processing for executing the program stored in the ROM 602 and expanding input image data; an application specific integrated circuit (ASIC) 603 for controlling the carriage motor M1, controlling the conveyor motor M2, generating control signals for controlling the recording head 3, and determining the type and the use state of the interfaces; a RAM (random-access memory) 604 containing the expansion areas of image data, and working areas for program execution; a system bus 605 for mutually connecting the MPU 601, the ASIC 603, and the RAM 604 for transferring data; and an A/D (analog-to-digital) converter 606 for inputting analog signals from the group of sensors described below and supplying digital signals to the MPU 601.

Also shown in FIG. 2 is a computer (or an image reader, a digital camera, etc.) 610-1, 610-2, 610-3 which is a supply source of image data, and is generically referred to as a host apparatus 610. Image data, commands, status signals, etc. are transmitted and received between the host apparatus 610 and the recording apparatus 1 through the interfaces (I/F) 611. In the example shown in FIG. 2, for the sake of convenience, an example in which three kinds of interfaces 611-1, 611-2 and 611-3 are connected to different host apparatuses 610-1, 610-2, and 610-3, respectively, is illustrated. However, a structure allowing interfaces of two kinds or more may be used. The present invention is not limited by the number of the interfaces. Also, it is not necessary that a plurality of host apparatuses 610-1, 610-2, and 610-3 are simultaneously connected. Furthermore, it is possible to connect to the same host apparatus using different interfaces.

Also shown in FIG. 2 are a group of switches 620 which include various switches for receiving command input by the operator. For example, the group of switches 620 includes a power switch 621, a print switch 622 for instructing the start of printing, a recovery switch 623 for instructing the start of the processing (recovery processing) for maintaining the ink-ejection performance of the recording head 3 in a good state, and the like. Also shown in FIG. 2 are a group of sensors 630 for detecting apparatus statuses. For example, the group of sensors 630 includes a position sensor 631, such as a photo couple, for detecting a home position, a temperature sensor 632 provided at an appropriate position of the recording apparatus 1 in order to detect the environment temperature, and the like.

Furthermore, FIG. 2 shows a carriage motor driver 640 which drives the carriage motor M1 for reciprocally scanning the carriage 2 in the directions of arrow A. A conveyor motor driver 642 drives the conveyor motor M2 for conveying the recording medium P.

By the configuration described above, the main unit of the recording apparatus 1 analyzes commands of the recording data transferred though the interface 611, and expands the image data to be used for recording in the RAM 604. The expansion area (expansion buffer) of the image data is a two-dimensional rectangular area. The lateral size of the area corresponds to the number of pixels Hp of a recordable area in the direction of the carriage movement (main scanning direction), and the vertical size of the area corresponds to the number of pixels of the recording medium recorded in the direction of conveying the recording medium (sub-main direction) by one recording scan of the recording head. This area is maintained in the RAM 604.

The storage area (print buffer) in the RAM 604 for transferring the recording data to the recording head 3 in the recording scan is also a two-dimensional rectangular area. The lateral size of this area corresponds to the number of pixels Vp of a recordable area in the direction of the main scanning direction, and the vertical size of the area corresponds to the number of pixels of the recording medium recorded in the sub-main direction by one recording scan of the recording head. This area is maintained in the RAM 604.

The ASIC 603 transfers driving data (DATA) of the recording element (ejection heater) to the recording head 3 while directly accessing the storage area in the RAM 604 when the recording head 3 performs a recording scan.

First Embodiment

Next, a description will be given of a first embodiment of the present invention. First, a description will be given of the amount of data per one pixel and the method of recording data in the recording apparatus 1 having the above-described structure.

In an ink-jet printer, recording is performed by the two-kind control of whether to eject an ink droplet (dot) or not, that is to say, whether or not a dot is formed, and thus whether to eject ink is controlled by binary data. Accordingly, when grayscale representation is performed using a method of recording binary data, it becomes possible to represent one pixel using multiple values by controlling the number of ejection droplets for one pixel as shown in FIG. 5. FIG. 5 shows two-bit data as an output value and the number of ejection droplets in one pixel corresponding to the value.

Moreover, in an ink-jet printer on which a recording head capable of ejecting two kind of dots having different sizes (in the following, described as a large dot and a small dot) are mounted, a grayscale is improved by recording by the combination of large dots and small dots for one pixel. In this manner, in a recording apparatus capable of recording large dots and small dots, there are two ways for specifying one pixel data. One of the ways is to specify data separately for a large dot and a small dot. The other is to specify data (the first column data in FIG. 6) in a mixed value of a large dot and a small dot as shown in FIG. 6, and the recording apparatus separates it into large dot data (large data) and small dot data (small data)(the second and the third columns in FIG. 6).

In FIG. 5, the first column indicates an output value, and the second column indicates the number of dot shots (number of dots). In a system using the method shown in FIG. 5, four-valued (0 to 3) data is output per one pixel. For example, for the recording pixel having an output value of 2, two-dot shots are recorded. For the recording pixel having an output value of 3, three-dot shots are recorded. Accordingly, one pixel is represented by four-valued data in terms of the amount of data, and thus it becomes possible to assign two bits at a minimum for one pixel.

FIG. 6 shows a table for separating the obtained output value into large data and small data. FIG. 6 shows the case in which the output value is nine-valued data. In FIG. 6, the first column contains an output value, the second column contains a small-data value when the output value in the first column is separated into large data and small data, and the third column contains a large-data value when the output value in the first column is separated into large data and small data. For example, when the output value is "0100" (decimally, 4), it is separated into two-bit data of small dot, "10", and two-bit data of large dot, "01".

Also, a combination of FIG. 5 and FIG. 6 is shown in FIG. 7. In FIG. 7, the first column contains an output value. The second column and the third column with the description "small dot" in the first row contain small dot data and the number of dots at that time, respectively. The fourth column and the fifth column with the description "large dot" in the first row contain large dot data and the number of dots at that time, respectively. That is to say, in the system described in FIG. 7, four bits nine-valued (0 to 8) data is output, and the data is separated into two-bit large data and two-bit small data.

For example, for a recording pixel having a four-bit output value of "0011" (decimally, 3), both large data and small data become two-bit data represented by "01" (decimally, 1), and recording is performed by one dot both for the large dot and the small dot. As shown in FIG. 7, in order to represent one pixel by nine-valued data, it is necessary to have at least four bits per one pixel.

Furthermore, when recording is performed by a plurality of recording scans in accordance with the output value obtained for each pixel shown in FIGS. 5 and 6, a host computer or printer main unit performs data conversion on the output value, and performs recording of the converted data with print masking.

For data conversion in the host computer, for example, the obtained output value is randomly converted into any one of a plurality of pieces of data for each output value. An example of this data conversion is shown in FIG. 8. In the figure, for example, if the output value before conversion is "01", the value is randomly converted into "1000", "0100", or "0010". After the host computer performs this data conversion, the host computer transfers the data to the printer main unit. After the printer main unit receives the data, the printer main unit performs recording with print masking of the received converted data. The print masking is performed on the data of the bit position determined for each print scanning. If the bit is "1", it corresponds to the recording of the dot, and if the bit is "0", it corresponds to the not-recording of the dot.

For example, assuming that each bit position of 4-bit data is abcd (each alphabet character is assigned to a bit position, and in this case, the data "1010" becomes a=1, b=0, c=1, d=0), if printing is performed by 6 passes, for the bit position of "a", data capture is performed with a probability of 50% in complementary relation of the first pass and the fourth pass. In the same manner, masking is performed on the second pass and the fifth pass for the bit position of "b", and the third pass and the sixth pass for the bit position of "c". In this regard, for the bit position of "d", data capture is not performed. Accordingly, when each pass is separated to complete image data by a plurality of passes (scans), a pass for recording each bit position data is determined by masking. Specifically, in the case of the data "1010", recording is performed by one dot either by the first pass or the fourth pass, and one dot either by the third pass or the sixth pass, that is, two dots in total. As described above, by the host computer randomly converting the data, it becomes possible to reduce the correlation of the print mask and the data, thus improving the image quality of the recording result.

However, in the above-described method, data conversion is performed randomly, and thus the amount of data becomes large as is apparent from FIG. 8. In this regard, an example of converting two bits into four bits is shown in FIG. 8.

In contrast, in the conversion in the printer main unit, as shown in FIG. 9, recording is performed by converting into fixed data in sequence and perform printing with print masking. Thus, although the image quality is somewhat deteriorated as compared with random expansion by a host computer, the amount of data to be transferred to the printer main unit can be from 4 bits 6 colors to 4 bits 3 colors, that is to say, can be reduced to half.

A description will be given of the processing of a recording system according to a first embodiment, using the recording apparatus 1 capable of recording by the recording method described above with reference to the flowchart in FIG. 4. FIG. 4A illustrates the processing in the host apparatus 610, and FIG. 4B illustrates the processing in the recording apparatus 1.

In the recording apparatus according to the present embodiment, a determination is made on which interface is to be used for recording data of a plurality of interfaces 611, and the processing for converting the recording data is varied in accordance with the determination result. In this regard, as a mode of conversion processing, recording no data is included in the case of a predetermined interface.

First, in step S41, when receiving a print instruction from an unillustrated application, the host apparatus 610 performs communication with the recording application 1. In the next step S42, a determination is made as to whether the interface 611 can be determined. If the interface cannot be determined, the processing proceeds to step S45. If it is possible to determine the interface, a determination is made in step S43 as to whether or not the determined interface 611 is a high speed interface. The high speed mentioned here indicates a high speed interface among a plurality of interfaces provided for the apparatus. In the first embodiment, FIG. 3 is a table illustrating how it is determined in step S42 whether the interface can be determined. The table shown in FIG. 3 is also used to determine whether or not each interface is a high speed interface in step S43. In the case of a high speed interface, the processing proceeds step S44, and in the case of a low speed interface, the processing proceeds step S45.

A theoretical definition of high speed interface or low speed interface as used herein depends on characteristics, specifically speed, of the recording apparatus. For example, one recording apparatus can perform one band of a printing operation in a specific amount of time, for example, one second. This time includes data processing for the recording apparatus 1 to prepare the data for printing and one reciprocal movement of the carriage 2 of the recording apparatus 1. It is assumed that the host apparatus 610 can prepare one band of data to be transferred to the recording apparatus 1 at one second intervals.

For example, a recording apparatus 1 that prints at 600 dpi (dots per inch) prints 5100 pixels (dots) of data when printing a line of letter-sized (8.5 inches×11 inches) (600*8.5). If the pixel data is four bit/six color data, it is 24 bits per pixel or 122,400 bits per band. If there are sixty-four, nozzles, the theoretical speed of the printer is about 7.8336 megabits/second (122,400×64). Since all of the nozzles may not be firing at once, the actual speed is less than the theoretical speed.

Based on the theoretical speed calculated in the example above, the printer can continuously print data if the data is transferred from the host computer 610 to the printer over an interface 611 at a data transfer rate of 7.8336 megabits/second or faster.

Various methods can be used for determining whether the interface is a high speed interface. In the example shown and described herein, a table, such as that shown in FIG. 3 is used to determine whether the interface is a high speed interface. In the example shown in FIG. 3, the interfaces that can be identified include USB, IrDA (Infrared Data Association) and BT. In this example it is impossible to identify any other type of interface. An interface that can not be identified is assumed to be a low speed interface. Interfaces having a transfer rate meeting or exceeding a threshold value, for example 7.8336 megabits/second (as in the example above), are identified as high speed interfaces and interfaces having a transfer rate below the threshold value are identified as low speed interfaces. In the example shown, USB which has a transfer rate of about twelve megabits per second is identified as a high speed interface, IrDA which has a transfer rate of about four megabits per second is identified as a low speed interface and BT which has a transfer rate of about one megabit per second (first generation technology) to two megabits per second (second generation technology) is identified as a low speed interface.

In the above description, the interface speed is classified as a high speed interface or a low speed interface. However, the present invention is not limited to two such speeds. For example, the interface speed can be classified as a high speed interface, an intermediate speed interface or a low speed interfaces, and can apply appropriate data corresponding to each speed to transfer data from the host 610 to the recording apparatus 1, for example 4 bit 6 colors, 4 bit 3 colors or 2 bit 3 colors. Further, the system according to the present invention may be configured to determine the data type (4 bit 6 colors, 4 bit 3 colors or 2 bit 3 colors) based on the interface speed and to transfer the record data with the determined data type.

In step S44, the interface 611 is determined to be high speed, and thus the host apparatus 610 creates both large-bit and small-bit data of cyan, magenta, and yellow, respectively, from the recording data by the output value of four grayscales shown in FIG. 5. Furthermore, the host computer creates recording data by converting each two-bit color data into four-bit data randomly as shown in FIG. 8. That is to say, the recording data is created by six colors (six colors including both large and small of cyan, magenta, and yellow colors, respectively), each of which has four bits, respectively. The recording data created in this manner is transferred to the recording apparatus 1 in step S46.

If the processing proceeds to step S45, the interface 611 is a low speed or unknown interface, and thus the host apparatus 610 creates the recording data, for the three colors, that is, cyan, magenta, and yellow, as the four-bit data shown by the first column in FIGS. 6 and 7. In step S46, the data is transferred to the recording apparatus 1. The print data created in step S45 has a smaller amount of data than that of the recording data created by four bits and six colors in step S44 for the same document data. Thus, it is possible to shorten the time for transferring data. Accordingly, as compared with the case of having been determined as a high speed interface, the amount of data for the same recording area can be reduced. This means that when an interface having the same speed is used, it is possible to shorten the time required for the data transfer corresponding to the same recording area. In the present embodiment, if the interface is low speed or the interface is unknown, it is possible to reduce the occurrence of data waiting for the low speed interface by adopting a method that reduces the amount of data.

In step S46, when the data transfer is complete, the processing of the host apparatus 610 is terminated.

At the same time, in the next step S51, a determination is made as to whether the interface 611 used can be determined. If the interface is impossible to determine, the processing proceeds to step S56. If it is possible to determine the interface, in step S52, a determination is made as to whether or not the determined interface is a high speed interface. In this regard, the processing in steps S51 and S52 is performed based on the contents shown in FIG. 3. The information shown in FIG. 3 is held, for example, in the ROM 602, and the MPU 601 determines the interface 611 and the transfer rate together with the information on the interface from the ASIC 603. The processing proceeds to step S53 in the case of a high speed interface, and proceeds to step S56 in the case of a low speed interface.

If the interface 611 is determined to be high speed, in step S53, the recording apparatus 1 receives recording data from the host apparatus 610, and, in step S54, performs printing (recording) using the received data. The receiving of the recording data in step S53 and the print processing in step S54 continue until the recording data is determined to be completed in step S55.

On the other hand, if the interface 611 has been determined to be unknown or low speed, the recording apparatus 1 receives the recording data from the host apparatus 610 in step S56. In step S57, the recording apparatus 1 receives the four-bit recording data shown at the first column in FIG. 7 for each color, and then separates the data into individual two bit, two colors, shown in the second column (small data) and the fourth column (large data) in FIG. 7. That is to say, the recording apparatus 1 separates the received cyan data into two-bit cyan large data and two-bit cyan small data. For magenta and yellow, the recording apparatus 1 separates them into the two-bit large data and the two-bit small data, separately. Furthermore, the recording apparatus 1 main unit performs sequential conversion into the fix data as shown in FIG. 9, and then performs printing (recording) using the converted data in step S58. The above-described processing in steps S56 to S58 continues until the recording data is determined to be complete in step S59.

Here, the conversion processing to be performed on 2-bit data in the recording apparatus 1 is changed to the conversion into a fixed pattern as shown in FIG. 9 unlike the processing shown in FIG. 8, which is the case of performing in the host apparatus 601. This is because, in general, the processing capacity of the host apparatus 601 is higher than that of the recording apparatus 1, thus there is no problem in performance with performing data conversion processing randomly as shown in FIG. 8, and there is almost no influence on the generation of recording data and the transfer of the generated recording data. In contrast, if the recording apparatus 1 performs complicated processing as shown in FIG. 8 at a high speed by itself, the processing load is too heavy, and thus the influence on the recording speed is significant.

The determination of the interface and whether the interface is a high speed interface in steps S51 and S52 in the flowchart shown in FIG. 4B can be appropriately changed, for example, to be performed every time before printing, to be performed once when the power to the printer 1 is turned on, or to be performed when the interface is determined to be changed.

Also, the interface is determined in step S51 in FIG. 4B. However, the host apparatus 601 may add the interface information when creating recording data to be transferred to the recording apparatus 1 main unit, or may change part of or all of the recording data format depending on the interface. Then the recording apparatus 1 main unit can determine whether or not to perform the data conversion in step S57 in accordance with the received recording data without determining the interface in step S51.

Also, the processing for converting original data, which is to be the source of recording data, to, for example, three-color, two-bit, four-valued recording data (the recording data before processing in steps S44 and S45) as described above is called quantization, in general. In a recording apparatus such as an ink-jet printer, either processing called ED (error diffusion) or dither is used, in general, as the quantization method. When the quantization processing is performed, if the interface is determined to be high speed, the processing called ED processing, which produces high image quality and takes a relatively long time, is performed. On the other hand, if the interface is determined to be low speed, the processing called dithering processing, which produces low image quality and is capable of executing at a relatively high speed, is performed.

In general, high-image-quality processing takes time in processing because the processing is complicated. In contrast, low-image-quality processing is simple and can be executed at a high speed. When a high speed interface is used, a short time is needed for data transfer, and thus there is no problem with high-image-quality processing which takes time such as ED processing. However, when a low speed interface is used, a relatively long time is needed for data transfer, and thus it is desirable to employ high speed processing, which enables the power of the host apparatus 601 to be used for data transfer as much as possible.

Furthermore, in the ED processing, the input value of a noticed pixel is compared with a threshold value, and processing is performed in accordance with the comparison result. At this time, processing is performed while the difference (error) between the input value and a threshold value is distributed (diffused), and thus processing takes time. Also, the converted recording data is significantly dispersed so that although the image becomes high quality, the compression rate becomes low. On the other hand, the dithering processing is simple comparison processing between the received data and a pattern storing a threshold value called a dither matrix (or dither pattern). Thus, although the processing can be executed at a high speed, the processing is apt to be cyclic for the size of the dither matrix because of using the dither matrix repeatedly. The pattern by the cycle of the dither matrix affects the data after conversion, and thus the image becomes low quality compared with the ED processing. However, it is possible to compress at a high compression rate by using a compression processing method matched with the cycle of the dither matrix. It is therefore possible to make the size of the recording data after conversion smaller in size. Although it is possible to use the compression matched with the cycle of the dither matrix for the recording data after the ED processing, the compression rate of the recording data is not particularly increased in the ED processing. Thus, it is desirable to perform compression matched with the ED processing in consideration of the time, the load, and the compression rate needed for the compression and decompression processing. That is to say, when changing the ED processing and the dithering processing in accordance with an interface, it is effective to change the compression method to compression processing A matched with the cycle at dithering time, and to change the compression method to compression processing B, which is different from the compression processing A, at the ED processing time.

As described above, in FIG. 13, the recording data creation processing according to the first embodiment is shown for the state in each step of the host apparatus 601, at data transfer time, and the recording apparatus 1.

FIG. 13 is a table illustrating data conversion processing in each step of the host apparatus 601, at data transfer time, and the recording apparatus 1 according to the first embodiment. FIG. 13 shows, in each state of whether or not an interface can be determined and each interface speed (high speed and low speed), the quantization processing, the number-of-colors conversion processing, the number-of-bits conversion processing, and the number of colors and the number of bits at data transfer time, and the number-of-colors conversion processing and the number-of-bits conversion processing performed by the recording apparatus 1. In this regard, the data conversion processing in the first embodiment includes the following:

Quantization: the processing for converting RGB input data into the form conforming to the ink system of a recording apparatus, for example, color data of cyan, magenta, and yellow, or color data of cyan, magenta, yellow, and black. As a generally known processing, the ED processing and the dither processing described above are included.

Compression: the processing for compressing normal data and the data is decompressed afterward.

Number-of-colors conversion processing: the processing for converting three colors (cyan, magenta, and yellow) into six colors (cyan large dots, cyan small dots, magenta large dots, magenta small dots, yellow large dots, and yellow small dots) corresponding to the ink system of the recording apparatus. Here, the conversion is performed into large dots and small dots. However, when the recording apparatus is capable of using inks having different densities (thick ink and light ink) for each color, the conversion into thick dots and light dots is included.

Number-of-bits conversion processing: the processing for converting, for example, two-bit data into four-bit data for each color of the ink system of the recording apparatus. At this time, there are, for example, a case of randomly converting from two bits into four bits as shown in FIG. 8 and, for example, a case of converting into a fixed pattern as shown in FIG. 9.

The data conversion processing does not necessarily perform all of the processing. At least part of the processing should be performed.

Referring back to FIG. 13, a description will be given. As described above, there are determination possible interfaces and determination impossible interfaces. In the case of determination possible interfaces, the interfaces are classified into high speed and low speed. Also, in the case of determination impossible interfaces, the processing corresponding to a low speed interface is performed in the first embodiment.

Now, a brief description will be given once again of the processing in each of the host apparatus 601, at data transfer time, and in the recording apparatus 1. First, as described above, in the quantization in the host apparatus 601, the ED processing is used for a high speed interface, because the transfer can be easily performed although the quantization processing takes time. Also, dithering processing is used for a high speed interface in order to perform the quantization processing at a high speed. At the same time, it is effective to change the compression method.

For a high speed interface, when the quantization is used, the output is performed such that the number of colors, the number of bits and the number of output grayscales are converted into six colors (cyan large dots, cyan small dots, magenta large dots, magenta small dots, yellow large dots, and yellow small dots), each two bits, and four values, and then are individually converted into four bits and four values (FIG. 8). For a low speed interface, three colors (cyan, magenta, and yellow), each four bits, and four values are output. The recording data created in such a host apparatus 601 is transferred to the recording apparatus 1. That is to say, at transfer time, if the interface is determined to be high speed, six-color and four-bit data is transferred, whereas if the interface is determined to be low speed, three-color and four-bit data is transferred. In this manner, if relatively large recording data is transferred for a high speed interface compared with a low speed interface, it becomes possible to transfer a different amount of recording data in accordance with the high speed interface and the low speed interface. The processing described so far is the processing performed by the flowchart shown in FIG. 4A.

Next, a description will be given of the processing in the recording apparatus 1 shown by the flowchart in FIG. 4B. The recording apparatus 1 records the transferred recording data. For a low speed interface, the recording apparatus 1 main unit converts the three-color four-bit and nine-valued data into the six-color four-bit and four-valued data (FIGS. 7 and 9).

As described above, in the first embodiment, if the interface is low speed (here, in the case of a relatively low speed interface among a plurality of interfaces included in the apparatus), the data transfer becomes the bottleneck. Thus, the amount of recording data to be transferred from the host apparatus 601 to the recording apparatus 1 is reduced by the recording apparatus 1 main unit performing part of the data conversion processing performed by the host apparatus 601 when the interface is high speed. When the same data processing is performed in the recording apparatus 1 main unit, it takes more time than the case of performing the processing in the host apparatus 601. However, the amount of data to be transferred can be reduced by doing in this manner for a low speed interface, thus making it possible to improve the transfer rate. It is therefore possible to remarkably suppress the decrease of the recording time of the entire system. Also, by the recording apparatus 1 main unit performing part of the data conversion processing performed by the host apparatus 601 up to now, it becomes possible to reduce the amount of recording data at data transfer time and to suppress the deterioration of the image quality of the print result at the same time.

As described above, according to the first embodiment, the number of colors of the data transferred to the recording apparatus is changed in accordance with the interface, and thus when the recording apparatus is connected to the printer 1 through an interface having a low transfer rate, it is possible to prevent or to suppress the occurrence of data-transfer waiting. Furthermore, by performing data conversion in the recording apparatus at the same time, it becomes possible to perform recording while keeping the deterioration of the image quality at a minimum without reducing the number of colors and grayscales when recording data to a recording medium.

As described above, a description has been given of the first embodiment. However, it is possible to make changes. Examples of such changes are described next.

In the example shown in FIG. 13, as the processing to be performed by the host apparatus 601, at the time of quantization by the ED processing or the dithering processing, data is created by six colors each two bits. However, it is possible to create three-color, each four-bit data, subsequently to convert it into six-color, two-bit data (FIG. 7), and furthermore to convert it into each four bits (FIG. 8). An example, in which the number-of-colors conversion processing (or number of colors), the number-of-bits conversion processing (or number of bits), etc., in each of the host apparatus 601, at data transfer time, and the recording apparatus 1 are summarized, is shown in FIG. 14.

In the first embodiment described above, for the data to be transferred to the recording apparatus 1 main unit, when using an interface other than the interface determined to be high speed, the recording apparatus 1 main unit receives four-bit, three-color (cyan, magenta, yellow) data, and performs the processing, such as the separation of data into large dot data and small dot data. However, two-bit, six-color (six colors including both large and small of individual cyan, magenta, and yellow) data may be transferred to the recording apparatus 1 main unit, and two-bit data may be converted into fixed data in sequence as shown in FIG. 9 to be printed with print masking.

When the amount of data to be transferred to the recording apparatus 1 main unit needs to be reduced more than the reduction in the first embodiment at the time of using a low speed interface, two-bit, three-color (cyan, magenta, and yellow) data may be transferred and the two-bit data may be converted into fixed data in sequence as shown in FIG. 9 to be printed with print masking, although the image quality becomes worse than that of the first embodiment described above.

Also, in recent years, recording apparatuses including a plurality of inks having relatively different ink densities, such as so-called dark ink and light ink, and ink-jet recording apparatuses including red, blue, green inks, etc., have begun to be used. Thus, if the number of inks used is changed depending on an interface, it becomes possible to adjust the amount of data to be transferred to the recording apparatus 1 main unit.

In this regard, the determination of whether the interface is high speed or low speed is made by a relative comparison between the engine speed (a recording speed in a state having no waiting for data transfer) of the recording apparatus 1 main unit performing recording and the data transfer rate. This is because if the data transfer rate is sufficiently high with respect to the engine speed, there will be no problem with the recording by the recording apparatus 1, whereas if the data transfer rate is low with respect to the engine speed, a waiting state for data transfer occurs in the recording apparatus 1. Thus, in the first embodiment, in order to measure a normal recording speed, the data indicating a predetermined image pattern is converted into high-image-quality recording data, and a necessary transfer rate is calculated by the data size after the conversion and the time required for recording. An interface having a higher transfer rate than this value is determined to be high speed, and the other interface is determined to be low speed.

More specifically, assuming that the result of the conversion from the data indicating a standard pattern for measuring the speed into high-quality recording data is 34.8 megabytes, if about 170 seconds are required for recording when transferring the data using the interface with which no waiting for data transfer is confirmed to occur by the recording apparatus at the time of recording (for example, six-pass and bi-directional recording) of this recording data, the transfer rate necessary for transferring this recording data becomes about 204 kilobytes/second. Accordingly, an interface having a transfer rate higher than this is determined to be high speed and an interface having a lower transfer rate is determined to be low speed.

Normally, a printer driver can determine the type of the interface between an upper apparatus and a printer by bi-directional communication with a printer. However, there are cases where the printer driver cannot determine the type of interface.

A description will be given of the determination shown in FIG. 3 with an example. In this regard, in this example, a description will be given of the case using a computer PC (OS: Windows 2000®) as an upper apparatus (external device).

Referring to FIG. 3, the first row indicates the type of interface that can be connected, the second row indicates whether or not the host apparatus 601 can identify the interface described in the first row, and the third row indicates whether the interface is determined to be high speed or low speed. In the case of USB, 1284, and 1384, each of the interfaces can be determined and are high speed. In the case of IrDA and BT (Bluetooth connection), both of them can be determined, but are low speed. S/C denotes a server-client connection, and the interface cannot be determined in this case. The other means, for example, a case where a print file is directly transferred from an upper PC. The interface cannot be determined in this case either.

In this manner, there are cases where the determination of whether or not high speed transfer is allowed is possible and there are cases where the determination is impossible. However, even if the determination is not possible, if the interface can be limited to be high speed or low speed, the processing corresponding to the limited speed is performed.

Among the interfaces that cannot be determined, if there are interfaces capable of transferring at a high speed and interfaces incapable of doing so, it is desirable to process the interface that cannot be determined as a low speed interface. This is because the adverse effects by an increase in recording time, an increase in waste ink, color irregularities, etc., by the data-transfer waiting that occurs when transferring high-speed-interface recording data using a low speed interface is larger than the deterioration of the image quality of the print result occurring when transferring and recording low-speed-interface recording data using a high speed interface.

In the case where there are a plurality of interfaces that cannot be determined and the transfer rates of these interfaces include both high speed and low speed, it is natural to set the transfer rate to low speed as described above. However, the interfaces in recent years have been advancing constantly, and thus most of them have become high speed. Thus, if it is considered to be more advantageous to set the interface to be high speed even if the interface is unknown, the interface that cannot be determined may be assumed to be high speed. An example thereof is shown in FIG. 15.

In this regard, the above-described values for the criteria of whether the interface is high speed or low speed is a rough estimate. If the size of the recording data changes by the content of an original image, the number of colors after quantization, and the number of bits, the recording time changes in accordance with the number of the recording passes. Thus, it is not necessary to stick to the above-described values. Furthermore, as described above, a necessary transfer rate differs by the number of recording passes, and thus in a recording apparatus including a normal ink-jet printer, the print quality is often capable of being set on the printer driver. It is easily known that the criteria of the determination of high speed interface and low speed interface may be variable in accordance with the selected print quality.

In this regard, when a recording apparatus and a host apparatus are connected with a one-to-one relationship, there is no problem in setting high speed or low speed simply from the transfer rate as described above. However, when a printer is connected with a one-to-many relationship (or many-to-many relationship) as a network printer, the transfer rate changes by the congestion of the network, and there is a state in which data moving on the network should be as little as possible. For that purpose, a determination of whether high speed or low speed should not always be based on the transfer rate. It is sometimes necessary to determine high speed or low speed in consideration of the size (volume) of the recording data transmitted from the host apparatus to the recording apparatus.

Also, in the present embodiment, the interface that cannot be determined is handled in the same manner as a low speed interface. However, this is not necessarily needed as a matter of course. It is desirable to assign "high speed" or "low speed" to an interface in consideration of the interfaces that may be connected and the transfer abilities thereof. That is to say, of the interfaces that may be connected to the apparatus, if only one interface is determined to be low speed, the processing may be performed by determining another interface to be high speed when it is determined not to be that low speed interface.

Even when there is no problem with the transfer rate, if the recording apparatus is being shared over a network or by a plurality of users, it is not desirable to transfer large data over a network. Thus, when using a network, it becomes possible to reduce the amount of data necessary for recording over a network by handling the data in the same manner as the interface having a low transfer rate.

In the first embodiment described above, interfaces are determined to be separated into two kinds. However, this is not necessarily needed. The determination may be made to separate into three kinds or more, and the recording methods corresponding to each transfer rate may be provided.

Also, in the first embodiment, a description has been given of the recording apparatus capable of recording a large dot and a small dot as shown in FIG. 7. However, it is possible to obtain the same effects by using a pair of inks having different densities (dark ink and light ink).

Also, as is understood from the description of six colors, that is, both large and small of cyan, magenta, and yellow colors, the expression "color" includes a concept of having different dot sizes.

Second Embodiment

Next, a description will be given of a second embodiment of the present invention. A printer 1 according to the second embodiment is assumed to have a function of converting the recording data transferred from the host apparatus 610 in the same manner as the first embodiment described above.

In the first embodiment, the data transmitted to the recording apparatus 1 is switched into four-bit, six-color data and four-bit, three-color data, but the recording apparatus 1 performs data expansion, and records the data both with six colors (corresponds to six colors including large and small of cyan, magenta, and yellow colors).

When an image is formed using large dots and small dots, recording is performed by using small dots for high-light parts (light parts) and large dots for high-density parts. At this time, granularity impression is deteriorated (so-called connection between large and small dots) at the start area (the density area where large dots are started to be used with an increase in density from a low density area where large dots are not used) of large dots, thus deteriorating the image quality.

If grayscale recording is performed only by small dots, it becomes possible to perform recording with higher quality, because there is no start area of large dots.

At the same time, when recording is performed only by small dots, the impact area on the paper surface by a small dot is smaller than that of a large dot, and the volume of a small dot is relatively smaller than that of a large dot. Thus, it becomes necessary to increase the number of shots compared with the case of forming an image by large dots. Accordingly, when recording only by small dots, there is a tendency of increasing the amount of data per one color than the recording only by large dots and by a mixture of large dots with small dots. The present invention can be applicable for such a case.

Figure 10:
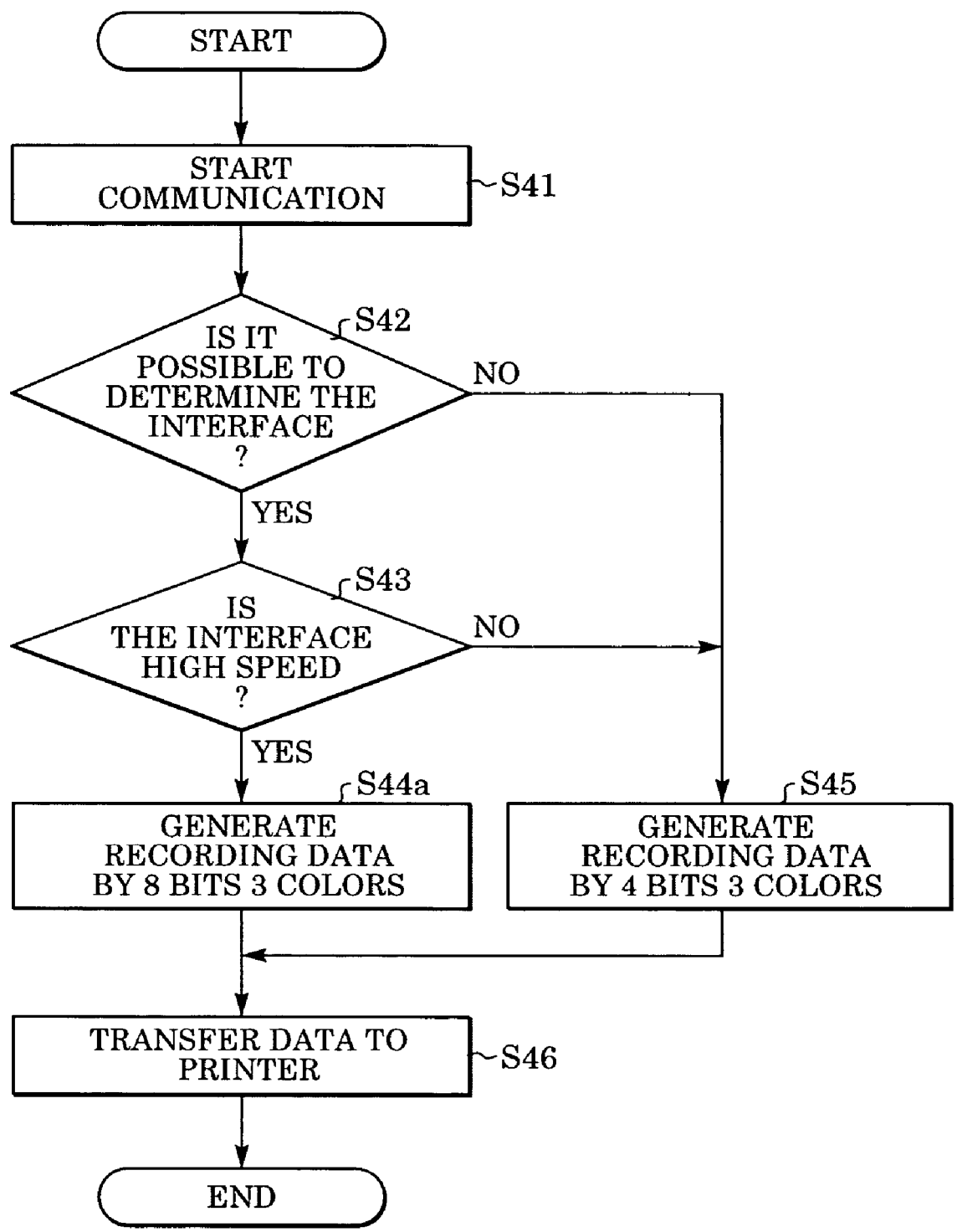
FIG. 10 is a flowchart illustrating the processing according to a second embodiment of the present invention.

A description will be given of the processing in the host apparatus 610 in a print system according to the second embodiment with reference to FIG. 10. In this regard, the processing in the printer 1 has the same operation as that of the first embodiment described with reference to FIG. 4B, and thus the description thereof will be omitted. However, the details of the printing in step S54 are different from those of the first embodiment, and thus the details on this point will be described later. In the second embodiment, a description will be given assuming that when recording is performed only by small dots, a maximum of 8 dots are shot onto one pixel. Also, the steps in which the same processing as that in FIG. 4A described in the first embodiment in FIG. 10 are performed have the same step numbers, and the description thereof will be partly omitted.

In steps S41 to S43, the same processing as that in the first embodiment is performed. In steps S42 and S43, if either of the determinations is "No", the processing proceeds to step S45 in the same manner as the first embodiment.

In step S45, since the interface 611 has been determined to be low speed, in the same manner as the first embodiment, the host apparatus 610 creates four-bit, three-color recording data as shown in the first column in FIG. 6 or FIG. 7 to transmit the data to the recording apparatus 1 in step S46. As described in the first embodiment, the recording apparatus 1 converts the four-bit, three-color recording data into four-bit, six-color (both large dot and small dot of three colors) by the conversion shown in FIGS. 7 and 9 to perform printing (recording).

On the other hand, if the interface is determined to be high speed in step S43, the processing proceeds to step S44a, and creates eight-bit, three-color recording data. Here, first, the four-bit output value shown in the first column in FIG. 11 is created as the cyan, magenta, and yellow recording data. Furthermore, the host apparatus 610 performs data conversion so as to emit the number of shots shown in the second column in FIG. 11. At this time, the host apparatus 610 converts the data into eight-bit data as shown in the third column in FIG. 11 to create three-color, eight-bit recording data.

After this, the eight-bit, three-color recording data created in step S46 is transferred to the recording apparatus 1. When receiving the transferred eight-bit, three-color recording data, the recording apparatus 1 performs recording in step S54 in FIG. 4B. At this time, a print masking is applied on the predetermined bit position of the data for each print scanning. If the bit position is "1", a dot is formed, and if the bit position is "0", a dot is not formed in the same manner.

The data capture form each bit by masking is performed if it is assumed that 8-bit data is abcdefgh (each alphabet character is assigned to a bit position, and in the case of 8-bit data "10101100", each bit becomes a=1, b=0, c=1, d=0, e=1, f=1, g=0, h=0), if printing is performed by 6 passes, for the bit position of "a", "c", "e", and "g", data capture is performed with a probability of 33% in complementary relation of the first pass, the third pass and the fifth pass. In the same manner, data capture is performed with a probability of 33% in complementary relation of the second pass, the fourth pass, and the sixth pass for the bit position of "b", "d", "f", and "h", and the third pass and the sixth pass for the bit position of "c". Specifically, in the case of the 8-bit data "10101100", recording is performed by three dots by the odd-numbered passes and one dot by one of the even-numbered passes, that is, four dots in total.

By the method described above, when an interface is not determined to be low speed in a recording apparatus having a plurality of interfaces, the same quality of the output image can be maintained as that of the first embodiment. Furthermore, if the interface is determined to be high speed, the dots to be used for recording is changed to only small dots, and thus it becomes possible to obtain still higher quality output image.

Third Embodiment

In the first and second embodiments of the present invention, the number of colors and the number of bits of the recording data to be transferred to the recording apparatus 1 are changed in accordance with the interface 611, and the data conversion processing in the recording apparatus 1 itself is also changed. However, when the recording apparatus 1 main unit cannot perform such data conversion processing, the number of recording passes may be increased so as to relatively reduce the data volume necessary for one scan in order to prevent the occurrence of data waiting.

Figure 12:
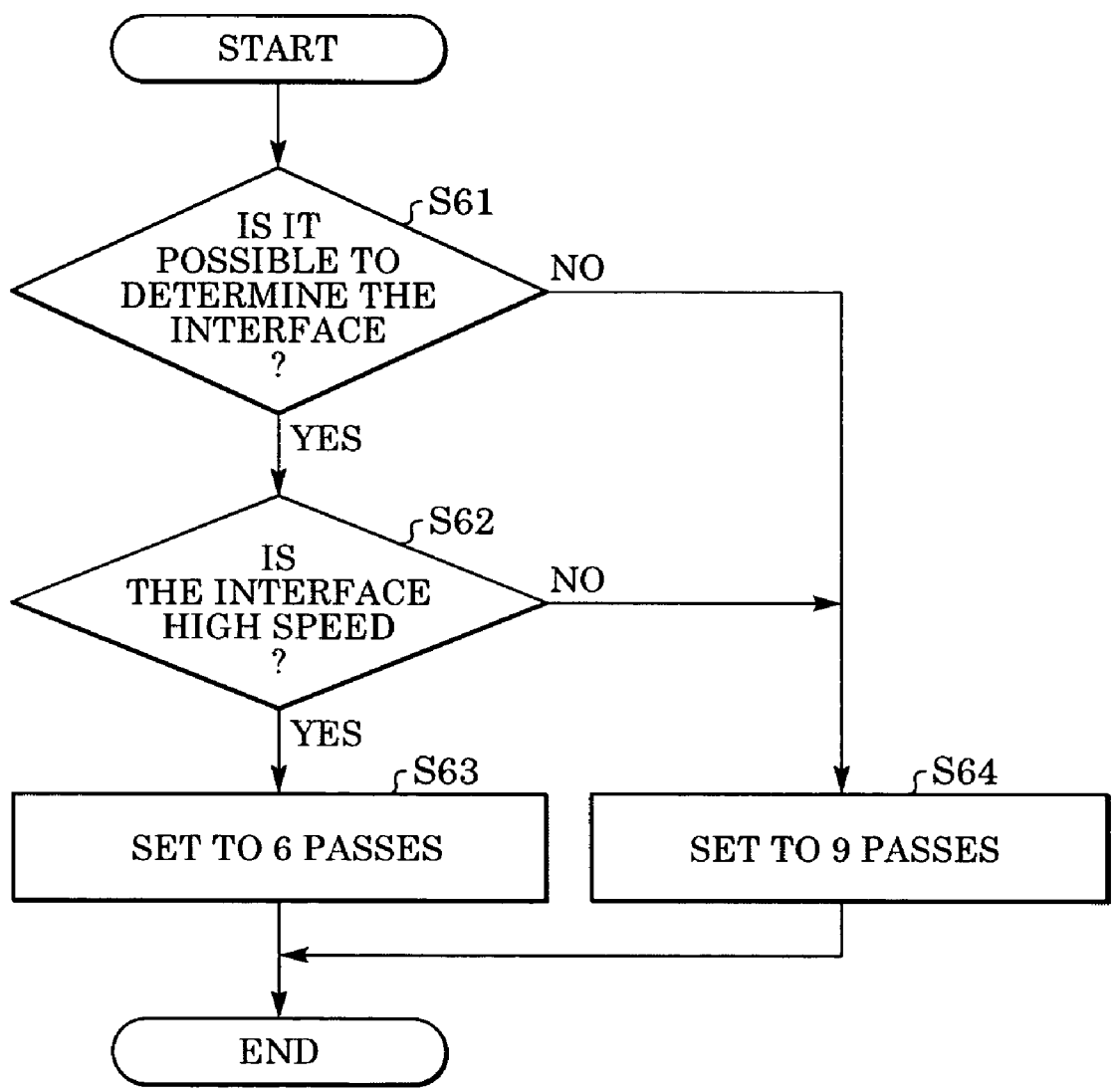
FIG. 12 is a flowchart illustrating the processing according to a third embodiment of the present invention.

FIG. 12 is a flowchart illustrating the processing of the recording apparatus 1 according to a third embodiment of the present invention. The processing shown in FIG. 12 is performed at a predetermined timing, such as at the time of power turning on to the recording apparatus 1, at the time of receiving a print instruction from the host apparatus 610 and the like.

First, in step S61, a determination is made as to whether the interface 611 used in the recording apparatus 1 can be determined. If it is impossible to determine the interface, the processing proceeds to step S64. If it is possible to determine the interface, in step S62, a determination is made as to whether or not the interface is high speed. If the interface is high speed, the processing proceeds to step S63, and if the interface is low speed, the processing proceeds to step S64.

In step S63, since the interface 611 has been determined to be high speed, the recording apparatus 1 sets the number of print passes to 6, then processing is terminated, and waits for the recording data. On the other hand, in step S64, since the type of the interface 611 has been determined to be unknown or low speed, the recording apparatus 1 sets the number of print passes to 9, then processing is terminated, and waits for the recording data.

In this regard, in the above-described example, the number of print passes is selected either from 6 passes or 9 passes. However, the number of print passes is not limited to these. The number of print passes can be changed in accordance with the function of the printer apparatus 1.

As described above, for the processing in which the number of print passes is changed in accordance with an interface, the data creation becomes possible by the common processing without performing special processing in accordance with the interface at recording data creation time at the main unit. Also, since recording can be continued without the occurrence of the data waiting, it becomes possible to prevent color irregularities caused by the inequality of the time period between multiple passes due to waiting-time variations. Also, it becomes possible to prevent an increase in preliminary ink ejection in order to maintain the nozzle states in a good condition depending on the waiting time, and an increase in wasted ink accompanying preliminary ink ejection. Also, although a recording time period increases, it becomes possible to improve image quality by the multiple-pass effect.

In this regard, in the embodiment described above, a method of printing is switched by determining the interfaces. However, the print method which is best suited for an interface may be determined by transferring dummy data in advance of printing and obtaining the transfer time thereof. Also, the method of printing may be determined such that for an interface that can be determined, the method of printing is switched depending on the determination result, and only for an interface that cannot be determined, the method of printing is determined from the dummy-data transfer time.

Also, in the embodiments described above, an interface is determined and the speed (high speed or low speed) thereof is determined in accordance with the table provided in advance, for example, as shown in FIG. 3. However, in advance of printing, dummy data (unrelated data with recording) for measuring a transfer rate may be transferred from an upper apparatus to a recording apparatus for the upper apparatus or the recording apparatus to determine the transfer rate, and a determination on whether high speed or low speed may be determined in accordance with the transfer rate. In this regard, the determination of this transfer rate (transmission speed) is performed by the upper apparatus in advance of the processing for creating data for recording, and the adequate recording data corresponding to the transfer rate can be generated in accordance with the determination result.

Also, for the interface that can be determined, a determination of whether high speed or low speed is made in accordance with the determination result of the interface, and only for the interface that cannot be determined, dummy data for measuring a transfer rate may be transferred to determine the transfer rate. This configuration can be applied not only to a printer provided with a plurality of types of interfaces, but also to a printer provided with one type of interface. For example, in the case where a plurality of applications are processed in parallel on an OS (operating system) of a PC, which is a host apparatus, the processing may be changed depending on the state of whether high speed transfer is possible or not in accordance with the effective speed of the data transfer.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-021314 filed Jan. 29, 2004 and Japanese Patent Application No. 2004-052123 filed Feb. 26, 2004, which are hereby incorporated by reference herein.

What is claimed is:

1. A recording apparatus having a plurality of types of interfaces capable of communicating with external devices, for recording using a recording head based on recording data input through any one of the plurality of types of interfaces, the recording apparatus comprising:

interface determination means for determining which interface from the plurality of types of interfaces is used for receiving the recording data and for determining whether the interface being used for receiving the recording data has a transfer rate selected from one of at least a relatively high transfer rate and a relatively low transfer rate;

conversion means for performing conversion processing on the received recording data; and control means for controlling the conversion processing performed by the conversion means in accordance with a determination result from the interface determination means, the control means controlling the conversion means to perform conversion processing including quantization processing on the recording data with increasing the amount of data when the interface determined by the interface determination means is an interface having a relatively low transfer rate among the plurality of types of interfaces and the control means controlling the conversion means not to perform conversion processing on the recording data when the interface determined by the interface determination means is an interface having a relatively high transfer rate among the plurality of types of interfaces.

2. The recording apparatus according to claim 1, wherein when the interface determination means cannot determine the interface to be used for receiving the recording data, the control means performs control on the assumption that the interface is an interface having a relatively low transfer rate among the plurality of types of interfaces.

3. The recording apparatus according to claim 1, wherein when the interface determination means cannot determine the interface to be used for receiving the recording data, the control means performs control on the assumption that the interface is an interface having a relatively high transfer rate among the plurality of types of interfaces.

4. The recording apparatus according to claim 1, wherein the control means controls, based on the determination result by the interface determination means, when the interface determined by the interface determination means is an interface having a relatively low transfer rate among the plurality of types of interfaces, the conversion means performs conversion processing by a first conversion method, and when the interface determined by the interface determination means is an interface having a relatively high transfer rate among the plurality of types of interfaces, the conversion means performs conversion processing by a second conversion method having a data increase rate smaller than a data increase rate of the first conversion method.

5. The recording apparatus according to claim 1, wherein the conversion means performs at least one of conversion processing for increasing the number of colors, conversion processing for increasing the number of dots, and conversion processing for changing a scan of recording dots among a plurality of scans in recording control for forming an image by a plurality of recording-head scans.

6. A method of controlling an external device, externally connected to a recording apparatus for recording based on recording data, for transferring recording data through any one of a plurality of types of interfaces possessed by the recording apparatus, the method comprising:

a determination step for determining which interface is used for transferring recording data to the recording apparatus among the plurality of types of interfaces included in the recording apparatus;

a generation step for generating recording data corresponding to an image to be recorded by the recording apparatus to be connected; and a transfer step for transferring the recording data generated in the generation step to the recording data, wherein generation processing in the generation step changes in accordance with the interface determined by the determination step, wherein when the interface determined in the determination step is an interface having a relatively high transfer rate among the plurality of types of interfaces possessed by the recording apparatus, recording data generation processing in the generation step changes so as to generate recording data having a larger data volume than a data volume at the time of an interface having a relatively low transfer rate, and wherein the generation step includes processing for quantizing multi-valued data corresponding to a plurality of colors, and quantization is performed by a quantization method corresponding to the interface determined by the determination step.

7. The method of controlling according to claim 6, wherein the quantization method includes error diffusion and dithering, and when the interface determined in the determination step is an interface having a relatively high transfer rate among the plurality of types of interfaces possessed by the recording apparatus, the quantization is performed by the error diffusion and when the interface determined in the determination step is an interface having a relatively low transfer rate, the quantization is performed by the dithering.

8. The method of controlling according to claim 7, further comprising a compression step for compressing recording data, wherein a compression method in the compression step changes depending on whether the interface determined in the determination step is an interface having a relatively high transfer rate or an interface having a relatively low transfer rate among the plurality of types of interfaces possessed by the recording apparatus.

9. A recording apparatus having a plurality of interfaces capable of communicating with external devices, for recording using a recording head based on recording data input through any one of the plurality of interfaces, the recording apparatus comprising:

interface determination means for determining which interface from the plurality of interfaces is used for receiving the recording data;

control means for recording in accordance with a method of recording selected from a plurality of different recording methods having different recording speeds on a recording medium with each other;

selection means for selecting a recording method used for recording based on the interface determined by the interface determination means;

scanning means for scanning a recording head in a main-scanning direction;

conveying means for conveying recording medium in a sub-scanning direction different from the main-scanning direction; and recording control means for controlling so as to complete recording on a predetermined area of the recording medium by a plurality of times of scanning of the recording head together with performing recording by repeating scanning of the recording head in the main-scanning direction and conveying the recording medium, wherein the plurality of recording methods are methods for recording so as to complete recording by a different number of times of scanning of the recording head in the main-scanning direction, wherein when the interface determined by the determination means is an interface having a relatively low transfer rate among the plurality of interfaces, the selection means selects a recording method having a greater times of scanning of the recording heads for completing recording than an interface having a relatively high transfer rate.

* * * * *